United States Patent
Dreher et al.

[15] 3,636,312
[45] Jan. 18, 1972

[54] LIVESTOCK WATER TANK WATER TEMPERATURE CONTROL APPARATUS

[72] Inventors: Robert F. Dreher, 7861 Kenwood; Albert H. Dreher, 6873 Brighton Blvd., both of Commerce City, Colo. 80022

[22] Filed: Feb. 6, 1970

[21] Appl. No.: 9,156

[52] U.S. Cl. .............................. 219/523, 119/73, 119/80, 137/341, 138/33, 219/316, 219/331, 219/333
[51] Int. Cl. .................................... A01k 7/02, H05b 3/06
[58] Field of Search ............. 219/523, 310, 312, 316, 317, 219/318, 323, 324, 333, 535, 331; 119/73, 78, 79, 80; 137/341; 138/32, 33

[56] References Cited

UNITED STATES PATENTS

| | | | |
|---|---|---|---|
| 1,793,431 | 2/1931 | Pelmulder | 119/73 |
| 2,133,388 | 10/1938 | Henderson | 119/73 |
| 2,201,901 | 5/1940 | Keen | 219/316 |
| 2,390,475 | 12/1945 | Thomas | 219/535 |
| 2,432,918 | 12/1947 | McCaskell | 219/317 |
| 2,469,617 | 5/1949 | Tippett | 119/73 X |
| 2,479,355 | 8/1949 | Hemker | 219/323 X |
| 2,545,967 | 3/1951 | Mickalek | 119/80 X |
| 2,570,694 | 10/1951 | Langenbahm | 119/73 X |
| 2,665,366 | 1/1954 | Cleveland | 219/323 X |
| 3,368,580 | 2/1968 | Carter | 119/78 X |

*Primary Examiner*—A. Bartis
*Attorney*—Richard D. Law

[57] ABSTRACT

An apparatus for controlling the water temperature in a livestock tank is provided with a conduit including a solenoid valve for controlling the supply of water to the tank. A water level detector controls the valve operation to maintain a predetermined water level in the tank. A first electric heater, which may comprise an electric light bulb, is provided adjacent the valve for heating the valve to prevent freezing. A second electric heater is provided for heating the water in the tank. In one embodiment, the conduit, valve, water level detector and first and second heaters are supported by a closed housing arranged to be removably mounted in the tank from the top edge thereof. This embodiment also includes separate thermostats for controlling operation of each of the first and second heaters. In another embodiment, the conduit, water level detector, valve and first and second heaters are permanently mounted to the tank.

5 Claims, 9 Drawing Figures

PATENTED JAN 18 1972
3,636,312
SHEET 1 OF 2
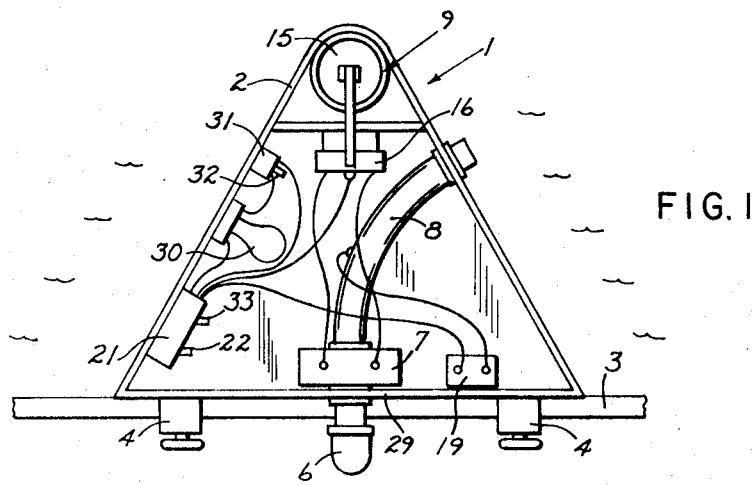
FIG. 1
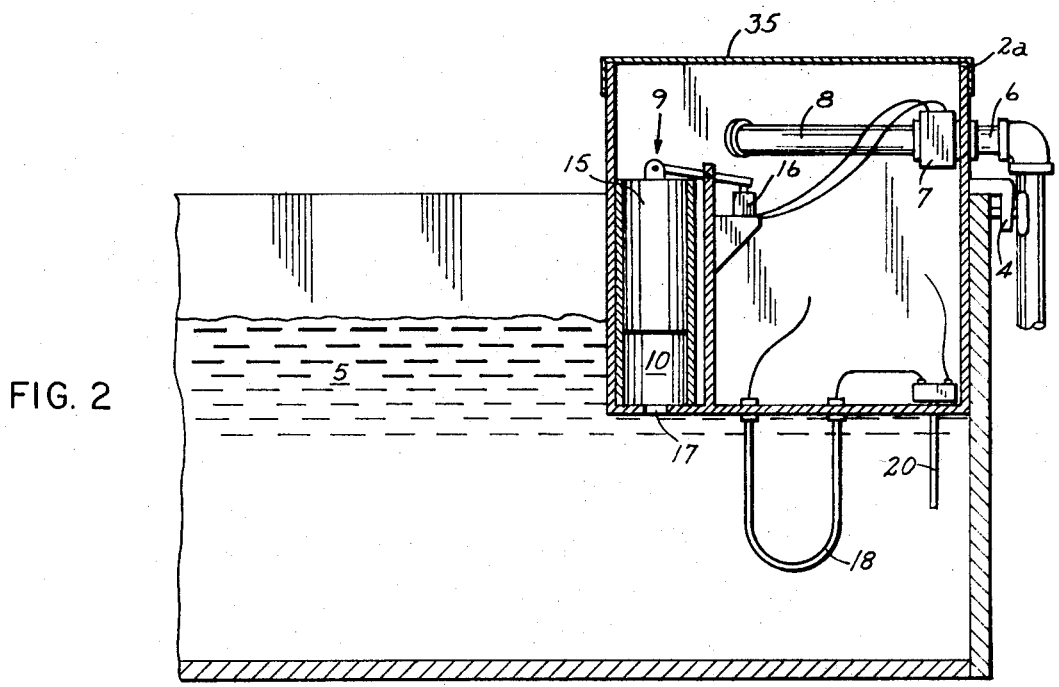
FIG. 2
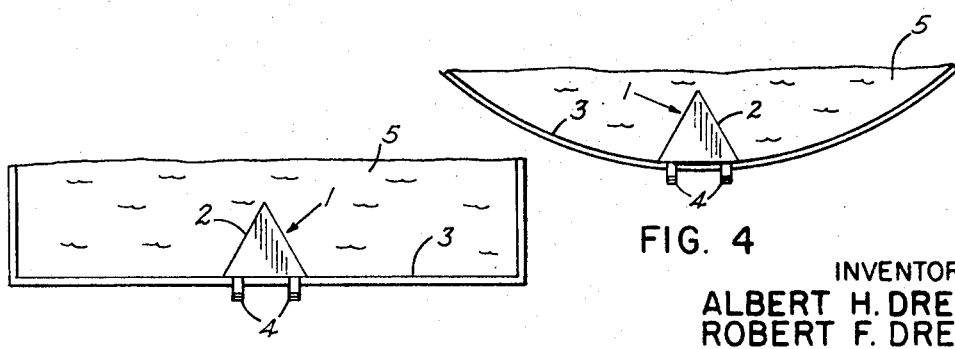
FIG. 3
FIG. 4
INVENTORS
ALBERT H. DREHER
ROBERT F. DREHER
BY
Richard H. Law
ATTORNEY

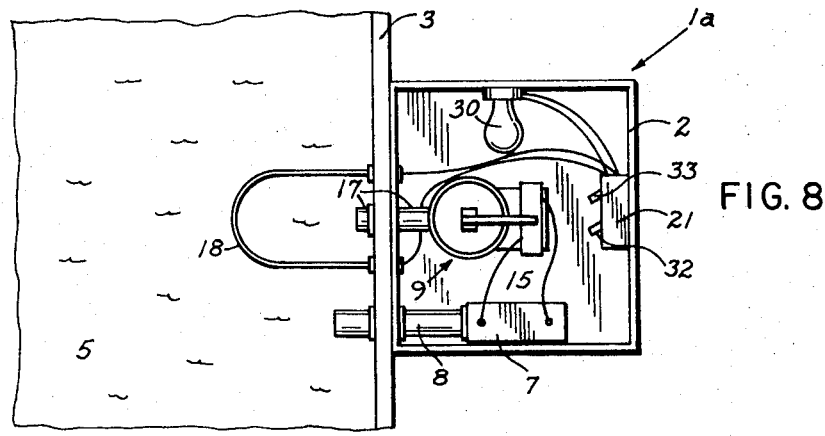
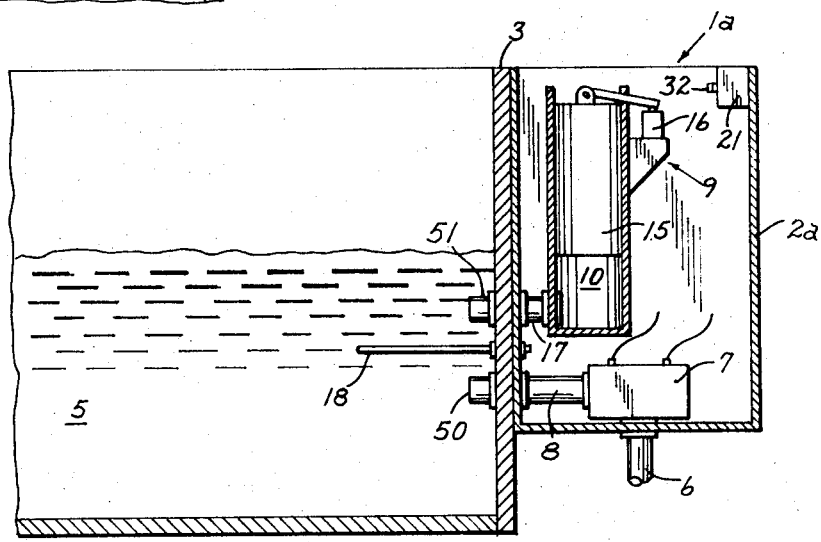
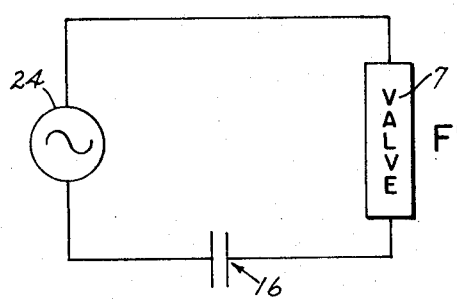
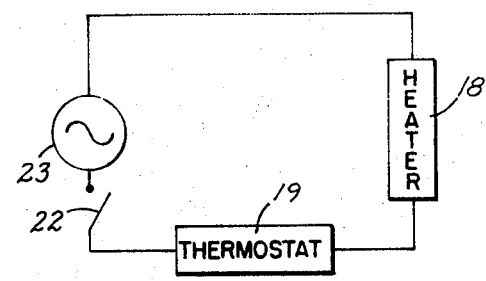
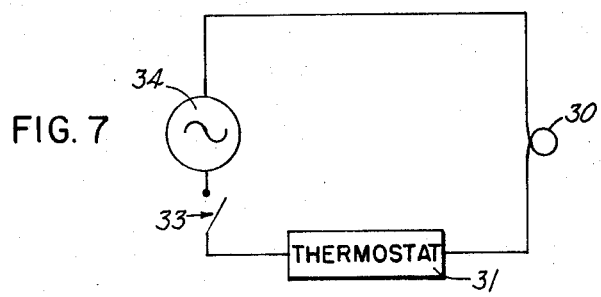

LIVESTOCK WATER TANK WATER TEMPERATURE CONTROL APPARATUS

The present invention relates to livestock water tank control apparatus, and more particularly, to an improved livestock-watering apparatus which is automatically operable to provide heated drinking water.

Generally, it has been found desirable to provide heated drinking water for livestock in cold weather. First, in cold weather the danger exists that the drinking water will freeze up with the result that the animals would have nothing to drink. Secondly, the livestock lose weight if they drink too much cold water. This weight loss results since the animals normally take in a large quantity of water whenever they take a drink, and consequently the animals burn up a substantial amount of heat energy in bringing this water up to their body temperature.

Heretofore, apparatus for providing heated drinking water for livestock have been devised. Generally, valve means were provided in such apparatus for controlling the level of the water in the apparatus. Frequently, however, such prior art apparatus did not operate reliably since the level central valve oftentimes froze. As a consequence, the apparatus would not function properly. Also, many water tank heaters are inadequately controlled as to temperature.

It is, accordingly, an object of the present invention to provide an improved livestock-watering apparatus for providing heated drinking water which obviates the aforementioned disadvantage of the prior art by being characterized by automatic and reliable operation.

It is further an object of the present invention to provide an improved livestock-watering apparatus for automatically providing heated drinking water which is characterized by having a nonfreezing, heated level control valve means.

It is additionally an object of the present invention to provide an improved livestock-watering apparatus for providing drinking water which is characterized by being operable to maintain the drinking water at a predetermined temperature.

In accomplishing these and other objects, there has been provided, in accordance with the present invention, a livestock water tank control apparatus including a water tank and valve means for controlling the supply of water thereto. Also provided is a water level indicator means for controlling the valve means so the water in the tank may be maintained at a predetermined level. First heater means are provided adjacent the valve means for heating the valve means to prevent freezing. Second heater means are provided for heating the water in the watering tank. Thermostat means are normally provided in conjunction with either or both of the heater means for controlling their operation. Thereby, the drinking water may be maintained at a predetermined temperature. Thus, there has been provided an improved livestock water tank control apparatus which automatically provides heated drinking water.

A better understanding of the present invention may be had from the following detailed description when read in conjunction with the accompanying drawings, in which:

FIG. 1 is a top cutaway view of one embodiment of a portable livestock water tank control apparatus according to the present invention;

FIG. 2 is a side cutaway view of the apparatus of FIG. 1;

FIG. 3 is a partial top view of one form of rectangular watering tank with the control apparatus of FIG. 1 illustrated as detachably mounted thereon;

FIG. 4 is a partial top view of a circular water tank with the control apparatus of FIG. 1 detachably mounted thereon;

FIG. 5 is a diagram of the circuitry employed with the water level control valve means of the livestock water tank apparatus of FIG. 1;

FIG. 6 is a diagram of the circuitry employed with the water-heating means of the livestock water tank apparatus of FIG. 1;

FIG. 7 is a diagram of the circuitry employed with the lamp used as heating means for the water flow control valve of the livestock-watering apparatus of FIG. 1;

FIG. 8 is a top cutaway view of another embodiment of livestock-watering apparatus, according to the present invention, permanently mounted on a water tank adapted therefor; and FIG. 9 is a side cutaway view of the apparatus of FIG. 8 mounted on the water tank adapted therefor.

Referring to the drawings in more detail, there is shown in FIGS. 1 and 2 a livestock water tank control apparatus generally indicated by numeral 1. The apparatus 1 is enclosed in a housing 2, and the housing 2 is detachably mounted on a water trough or tank 3 by means of clamps 4. It is noted that in FIGS. 1 and 2, the apparatus 1 is mounted on the inside of the tank 3 with the lower portion of the housing 2 positioned in the water 5 therein. Thus, as shown in FIGS. 3 and 4, the apparatus 1 may be clamped on any standard or conventional watering tank 3 and the tank 3 need not be specially constructed in order to use the apparatus 1.

The housing 2 of the apparatus 1 is formed in the shape of a triangle when viewed from above, as in FIG. 1, and has its base 29 mounted adjacent the wall of the trough 3. A water supply or conduit means including a pipe 6 runs through the base 29 and is connected with the input side of a normally closed solenoid-operated valve 7. The output side of the valve 7 is connected to a supply hose or pipe means 8. The hose 8 extends across the interior of the housing 2 and extends through one of its sidewalls at a point above the level of the water 5 in the tank 3.

Positioned at the apex of the triangular housing 2 is a level control device 9. The level control device 9 includes a chamber 10 with a float 15 therein. The float 15 is connected to a mechanical switch means 16 which, as is hereinafter explained, controls the operation of the solenoid-operated valve 7. An opening 17 is formed in the bottom wall of the housing 2 just below the chamber 10 so that the water 5 in the tank 3 has access to the chamber 10. As shown in FIG. 5, the mechanical switch 16 is connected in series with the solenoid-operated water flow control valve 7 across a conventional power source 24.

Mounted on the bottom wall of the housing 2 is a heater element 18. The heater element 18 is mounted on the outside of the housing 2 in order to extend into the water to heat the same. Also, mounted on the bottom wall of the housing 2 is a conventional thermostat 19 having its temperature-sensing element 20 positioned in the water 5 but spaced from the heater 18. A switchbox 21, including a off-on switch 22 is shown in FIG. 1. The switch 22 is connected in the circuit shown in FIG. 6 for controlling the energization of the water-heating means shown therein. The water-heating means shown in FIG. 6 includes the switch 22, the thermostat 19 and the heater 18 all connected in series across a conventional power source 23.

A lamp or heating element 30 is mounted on one wall of the housing 2 to provide means for heating the atmosphere in the housing 2, thereby to prevent the float 15 from freezing in the chamber 16 or the water control valve 7 from freezing in the water supply line. A conventional thermostat 31 having a temperature-sensing element 32 positioned in the interior of the housing 2 is also shown mounted on one sidewall of the housing 2. As shown in FIG. 8, the lamp 30 is connected in series with an on-off switch 33 and the thermostat 31 across a conventional power source 34. The switch 33 is located in the switchbox 21 in the housing 2. A removable cover 35 for the housing 2 is further shown in FIG. 2.

In operation, the livestock water tank control apparatus 1 may be positioned in any empty watering tank 3 by clamping the clamps 4 on the sides thereof. The pipe 6 is then connected to a water supply and the power source 24 is connected across the mechanical switch 16 and the solenoid-operated valve 7. With no water in the tank 3, the float 15 is in its lower position and as a result the mechanical switch 16 is moved to its closed position. The solenoid-operated valve 7 is then actuated to its open position and water 5 flows into the tank 3 through the hose 8. Water 5 continues to flow into the tank 3 until the desired level is reached whereat the float 15 is floated by the water 5 entering the chamber 10 so as to move the mechanical switch 16 to its open position. Once the switch 16 opens, the solenoid-operated valve 7 is deenergized and moves to its normally closed position. With the valve 7 closed, water in the pipe 6 is blocked from the hose 8 and no more water is added to the tank 3. The level control means provided by the level control device 9 and the switch 16 then functions along with the valve 7 to maintain the water 5 in the tank 3 at a predetermined minimum level.

To insure that the level control means 1 or the valve 7 does not freeze, heating means in the form of the electric lamp 30 (preferably 40-100 watts) is energized by moving the switch 33 to its on position. The lamp 30 burns until the temperature inside the housing reaches a minimum predetermined level at which the thermostat 31 opens the electrical circuit between the lamp 30 and the power source 34. The lamp 30 then remains off until the temperature in the housing 2 falls below the predetermined level. Thus, the lamp 2 along with the thermostat 31 functions to maintain the temperature in the housing 2 at a predetermined minimum level.

By energizing the switch 22, the heater element 18 is energized to heat the drinking water 5 to a predetermined temperature. The heater element 18 is energized and continues to supply heat to the water 5 until the temperature-sensing element 20 senses the predetermined temperature. At that instant the thermostat 19 opens the electrical circuit between the heater element 18 and the power source 23. Thereafter, the heater element 18 along with the thermostat 20 functions to maintain the temperature of the water 5 at a predetermined minimum level.

FIGS. 8 and 9 show an embodiment of the livestock water tank control apparatus 1 which is mounted on the outside portion of a specially constructed water tank 3. Since all parts in the apparatus 1a shown in FIGS. 8 and 9 are substantially identical with those of the apparatus shown in FIGS. 1-7, the same numbering system is used. The thermostats 19 and 31, however, are not incorporated in the apparatus 1a. Additionally, openings 50 and 51 are formed in the walls of the specially constructed tank 3 for accommodating the hose 8 and providing a passage in communication with the chamber 10 for water 5 in the tank 3, respectively. The clamps 4 are further not necessary for the apparatus 1a since the apparatus 1a is permanently mounted on the wall of the tank 3. Also, the housing 2a preferably extends to the ground for heating the water supply pipe which is above ground.

In operation, the apparatus 1a functions similar to that of the aforedescribed apparatus 1. The one principal difference is that the switches 22 and 33 closed, the lamp 3 and the heater element continuously supply heat. Since no thermostats are included in the apparatus 1a, heat is supplied to the water 5 and the interior of the housing 1 regardless of temperature. Such an arrangement may be desirable in very cold climates where there was no danger of the water 5 or the housing 2 becoming too hot.

Thus, there has been provided an improved livestock water tank control apparatus which automatically provides heated drinking water. Further, heater means are included in the apparatus for heating the apparatus itself so that it does not freeze in cold weather. Thermostats are, also, provided which may be incorporated into the apparatus for controlling the water temperature and the temperature within the interior of the apparatus housing.

I claim:

1. Apparatus for controlling livestock water tanks comprising removable, closed housing means arranged to be mounted in a tank from the top edge thereof and extend down into the tank a predetermined distance, said housing means being arranged to partially extend into water at its desired depth in the tank and maintain the interior of said housing means dry; conduit means for conducting water from a water supply through said housing to an outlet discharging into the tank on which said housing means is mounted; selectively actuated valve means mounted in said housing means and in said conduit means having a normally closed position for controlling the flow of water in said conduit means; water level detector means mounted in said housing with a lower inlet admitting water to said detector means, said level detector means arranged to produce a control signal at water levels below said desired depth; said valve means being actuated to its open position in response to said control signal; first heating means mounted in said housing means for heating said valve means and said level detector means; and second heating means depending downwardly from said housing for heating water in the tank.

2. Apparatus according to claim 1 wherein said first heating means is an electric light bulb.

3. Apparatus according to claim 1 wherein said water level detector means is a float-actuated detector mounted in a tube communicating with said inlet, providing a small volume of water internally of said housing means.

4. Apparatus according to claim 1 wherein said second heating means is controlled by a thermostat extending into the water in the tank.

5. Apparatus according to claim 1 wherein said valve means is a solenoid-operated valve and said control signal is an electrical signal.

* * * * *